No. 848,046. PATENTED MAR. 26, 1907.
E. C. PHILLIPS.
AUTOMOBILE WHEEL.
APPLICATION FILED NOV. 23, 1906.
2 SHEETS—SHEET 1.
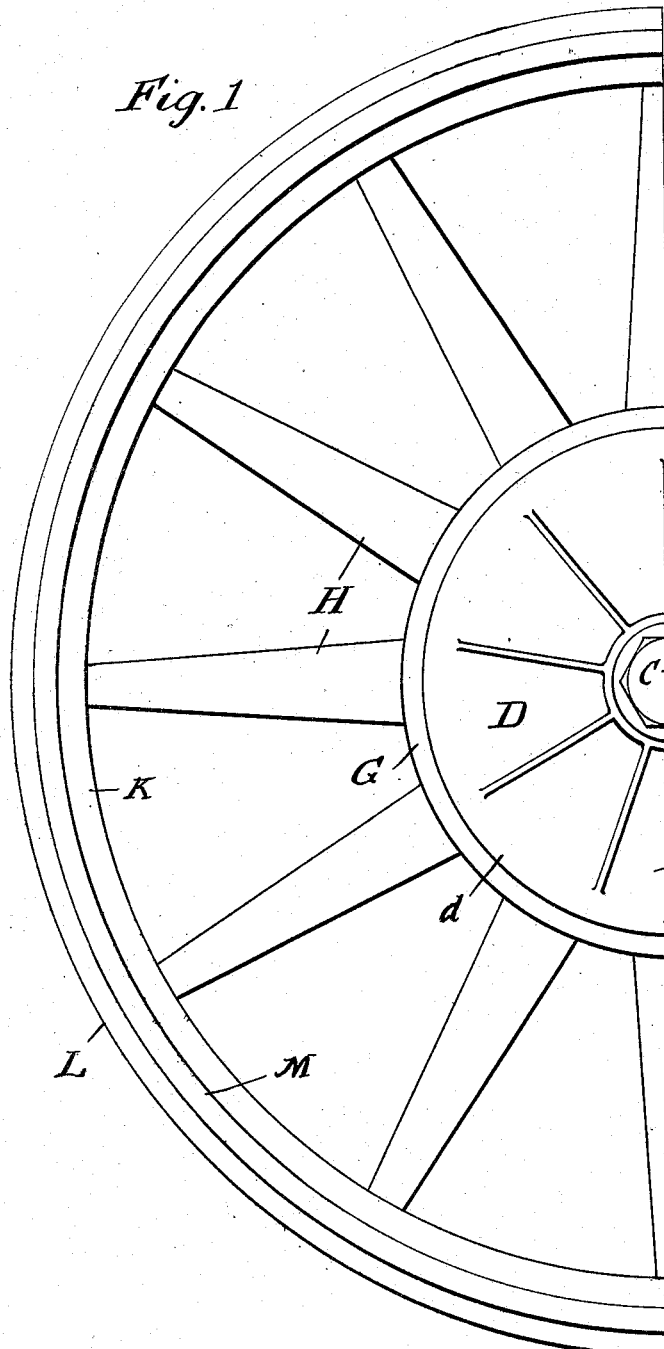
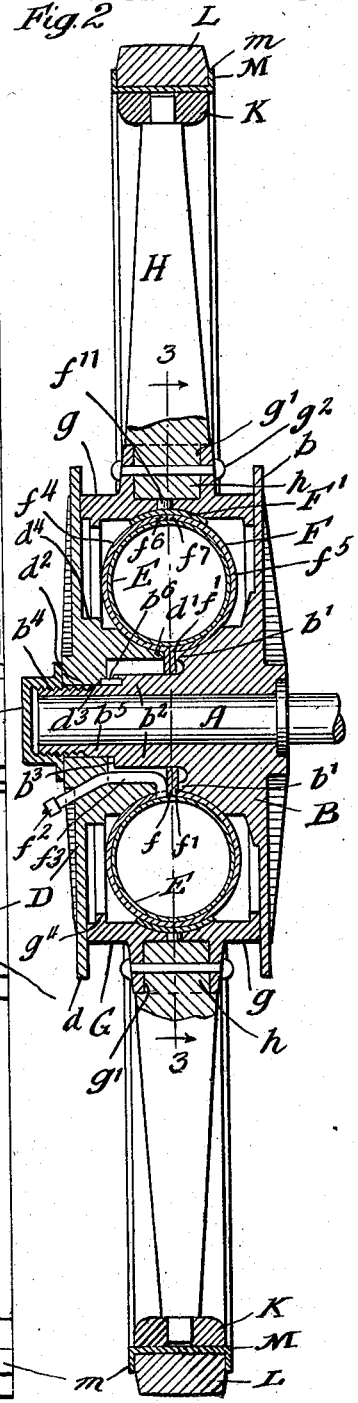
Witnesses:
Wm. Geiger
H. W. Munday
Inventor
Elwood C. Phillips.
By Munday, Evarts, Adcock & Clarke.
Attorneys.

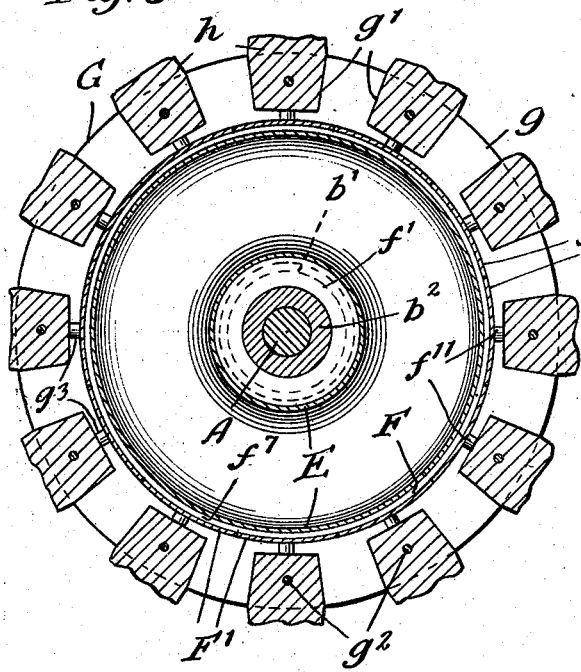
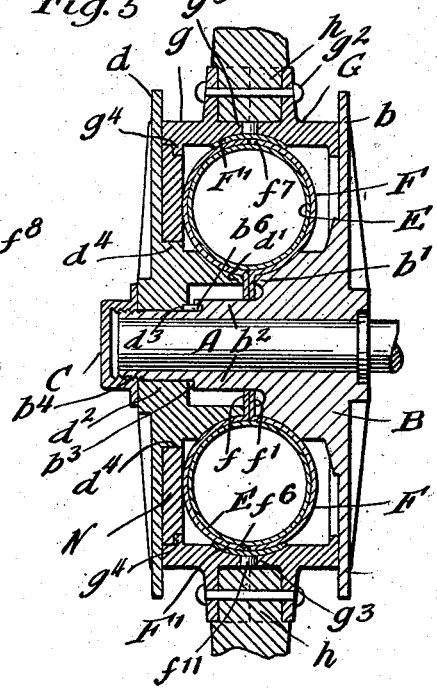
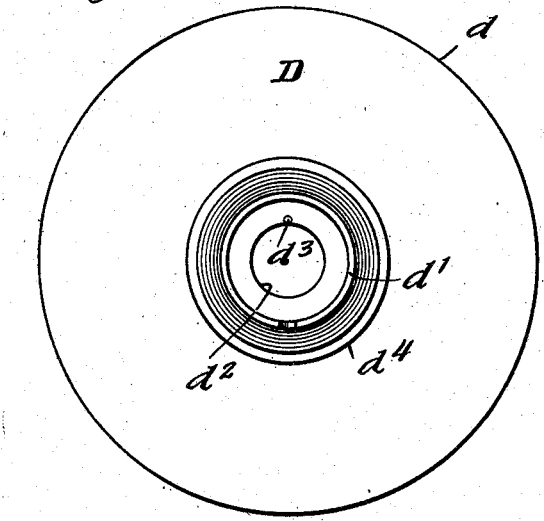
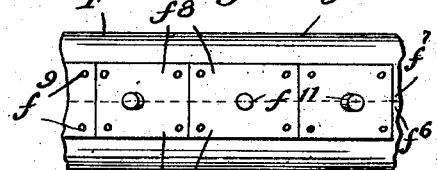
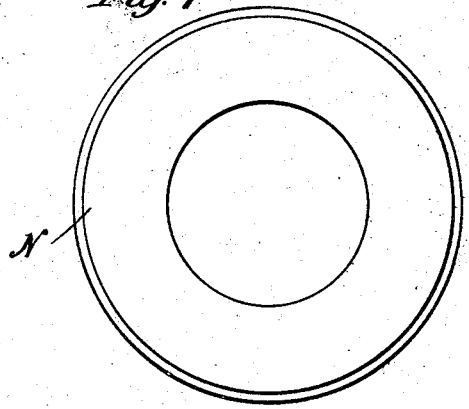

UNITED STATES PATENT OFFICE.

ELWOOD C. PHILLIPS, OF CHICAGO, ILLINOIS, ASSIGNOR OF ONE-HALF TO ALVARADO T. BENSON, OF CHICAGO, ILLINOIS.

AUTOMOBILE-WHEEL.

No. 848,046.        Specification of Letters Patent.        Patented March 26, 1907.

Application filed November 23, 1906. Serial No. 344,695.

*To all whom it may concern:*

Be it known that I, ELWOOD C. PHILLIPS, a citizen of the United States, residing at Chicago, in the county of Cook and State of Illinois, have invented a new and useful Improvement in Automobile-Wheels, of which the following is a specification.

My invention relates to automobile-wheels or cushion-wheels for automobiles and other vehicles.

The object of my invention is to provide a pneumatic cushioned wheel of a strong, simple, durable, and efficient construction suitable for use upon automobiles or other heavy vehicles in which the pneumatic casing, while operating efficiently to cushion the wheel and vehicle supported thereby, will not be liable to puncture or other injury, in which the pneumatic casing may be very quickly and easily removed and replaced, and in which also the wheel can be run or operated without injury to the pneumatic casing, although the pneumatic casing should be deflated.

My invention consists in the means I employ to practically accomplish this object or result—that is to say, it consists in a wheel having in coöperative combination a central hub provided with an annular guide flange or plate and a circular clamp rib or shoulder, a movable clamp-ring having an annular guide flange or plate and a circular clamp rib or shoulder coöperating with said central hub, a pneumatic casing between said central hub and said clamp-ring having its overlapping connecting edges clamped between said circular ribs or shoulders on the hub and clamp-ring, a movable spoke-ring fitting between the guide-flanges of the hub and clamp-ring and bearing against the pneumatic casing, a wheel-rim preferably of wood and connected by spokes with the movable spoke-ring, a rubber or elastic tire on the wheel-rim, and a metallic channel-rim on the wheel-rim for holding the rubber or elastic tire in place. To remove or replace the pneumatic casing, the clamp-ring, which is preferably held in place by a threaded nut engaging the central hub, is simply removed, and then the casing may be taken out or replaced. In case the casing should become deflated and a new casing should not be at hand to replace it a solid substitute ring may be inserted between the movable spoke-ring and the clamp-ring, so that the wheel can be temporarily used without its pneumatic cushion.

My invention also consists in the novel construction of parts and devices and in the novel combination of parts and devices herein shown or described.

In the accompanying drawing, Figure 1 is a side elevation showing one-half of a wheel embodying my invention. Fig. 2 is a central or diametric section through the wheel. Fig. 3 is a detail section on line 3 3 of Fig. 2. Fig. 4 is a detail inside face view of the clamp-ring. Fig. 5 is a detail diametric section of the hub or central portion of the wheel, showing the substitute solid supporting-ring in place. Fig. 6 is a detail peripheral view of a portion of the pneumatic casing and of the sectional bearing-plate which is interposed between the casing and the spoke-ring, and Fig. 7 is a detail inner face view of the substitute solid supporting-ring.

In the drawing, A represents the axle of the wheel; B, the central hub, which may be either secured to or journaled upon the axle, as desired. The central hub B has an annular guide flange or plate $b$ and a circular clamp rib or shoulder $b'$ and a reduced sleeve portion $b^2$, having an annular shoulder $b^3$ and screw-threads $b^4$ at its outer end or portion to receive the threaded clamp-nut C.

D is the clamp-ring, the same having an annular guide flange or plate $d$, a circular clamp rib or shoulder $d'$, and a central hollow or bearing portion $d^2$, fitting the reduced portion $b^5$ of the hub B.

F is the pneumatic casing, surrounding the inner tube E and having its overlapping or meeting edges $f\ f'$ tightly and securely clamped together by and between the circular clamp ribs or shoulders $b'$ of the hub B and $d'$ of the clamp-ring D, the overlapping lips or edges $f f'$ of the casing being at the inner periphery of the casing and on the median line of the wheel.

$f^2$ is the nipple, and $f^3$ the nipple-tube, leading through a suitable opening in the clamp-ring D to the inner tube of the pneumatic casing. To properly register the clamp-ring with the hub, the hub is preferably provided with a registering dowel $b^6$, which enters a suitable recess $d^3$ in the clamp-ring D.

G is the spoke-ring, fitting between the annular guide flanges or plates $b\ d$ of the hub and clamp-ring and bearing against the pneumatic casing. This spoke-ring G is preferably made in two halves or parts $g\ g$, meeting on the median line and each provided with a series of half-sockets $g'$ $g'$ to receive the tenons $h$ of the spokes H and securely clamped together by connecting-rivets $g^2$, which preferably extend through the spokes. This split or divided construction of the spoke-ring is a convenience in tightly securing the spokes in place, and when the two halves of the spoke-ring are securely riveted together they together form a ring of great strength and rigidity.

The casing F is preferably of leather and may be preferably formed of two pieces or strips $f^4$ $f^5$, having abutting edges $f^6$ $f^7$ at the outer periphery of the casing on the median line of the wheel.

F' is a sectional bearing-plate, preferably of metal, interposed between the spoke-ring G and the pneumatic casing. The separate sections $f^8$ of this sectional bearing plate or rim are preferably secured by rivets $f^9$ to the casing F, one rivet being preferably inserted through each of the four corners of each of the sections of the bearing-plate. This sectional bearing-plate may be made of any desired number of sections. I prefer, however, to make the sections correspond to the number of spokes in the wheel. The casing thus flexibly connects together the sections of the bearing-plate at their abutting ends, and the sectional bearing-plate also thus connects together the meeting or abutting edges of the two strips $f^4$ $f^5$ of which the casing F is composed.

K is the rim of the wheel, the same being preferably of wood.

L is the rubber or elastic tire, and M is a channel rim or member, preferably of metal, surrounding the rim K and having flanges $m$ to embrace the rubber or elastic tire L.

The clamp-ring D is provided with an annular shoulder $d^4$ to afford a bearing for a substitute solid supporting-ring N, which may be interposed between the spoke-ring G and the clamp-ring in case the pneumatic cushion or casing should give out, the spoke-ring being also furnished with an annular shoulder $g^4$ to receive this substitute supporting-ring N.

The sectional bearing-plate F' and the spoke-ring are provided with interengaging holding devices to prevent the one from slipping in respect to the other. These interengaging holding devices preferably consist of rivet heads or projections $f^{11}$ on the sectional bearing-plate or ring F', one preferably on each section thereof, and notches or recesses $g^3$ on the spoke-ring. The notches or recesses $g^3$ are preferably formed on the meeting edges of the two members of the split spoke-ring.

I claim—

1. In a pneumatic cushioned wheel for automobiles or other vehicles, the combination of a central hub having an annular guide-flange and a circular clamp-rib, of a clamp-ring having an annular guide-flange and a circular clamp-rib, a pneumatic casing between said central hub and clamp-ring and having its overlapping lips or meeting edges clamped between said circular clamp-ribs on the hub and clamp-ring, a movable spoke-ring fitting between said guide-flanges on the hub and clamp-ring and bearing against said pneumatic casing, said clamp-ring and spoke-ring having also provision for receiving between them a substitute solid supporting-ring, a sectional bearing-plate interposed between said pneumatic casing and said spoke-ring, and provided with projections engaging recesses in the spoke-ring, a wheel-rim, spokes connecting the wheel-rim with the spoke-ring, a rubber or elastic tire and a metallic flanged rim for the tire on the wheel-rim, substantially as specified.

2. In a pneumatic cushioned wheel for automobiles or other vehicles, the combination of a central hub having a guide-flange and a circular clamp-rib, of a clamp-ring having an annular guide-flange and a circular clamp-rib, a pneumatic casing between said hub and clamp-ring having its overlapping lips or meeting edges embraced between said clamp-ribs and a movable spoke-ring fitting between said guide-flanges and bearing against the casing, substantially as specified.

3. In a pneumatic cushioned wheel for automobiles or other vehicles, the combination of a central hub having a guide-flange and a circular clamp-rib, of a clamp-ring having an annular guide-flange and a circular clamp-rib, a pneumatic casing between said hub and clamp-ring having its overlapping lips or meeting edges embraced between said clamp-ribs and a movable spoke-ring fitting between said guide-flanges and bearing against the casing, and a sectional bearing plate or ring interposed between said spoke-ring and said pneumatic casing, substantially as specified.

4. In a pneumatic cushioned wheel for automobiles or other vehicles, the combination of a central hub having a guide-flange and a circular clamp-rib, of a clamp-ring having an annular guide-flange and a circular clamp-rib, a pneumatic casing between said hub and clamp-ring having its overlapping lips or meeting edges embraced between said clamp-ribs, and a movable spoke-ring fitting between said guide-flanges and bearing against the casing, the sections of said bearing plate or ring being secured to the casing, substantially as specified.

5. In a pneumatic cushioned wheel for automobiles or other vehicles, the combination of a central hub having a guide-flange and a circular clamp-rib, of a clamp-ring having an annular guide-flange and a circular clamp-rib, a pneumatic casing between said hub and clamp-ring having its overlapping lips or meeting edges embraced between said clamp-ribs and a movable spoke-ring fitting between said guide-flanges and bearing against the casing, the sections of said bearing plate or ring being secured to the casing, and provided with projections engaging recesses with which the spoke-ring is provided, substantially as specified.

6. In a pneumatic cushioned wheel for automobiles or other vehicles, the combination of a central hub having a guide-flange and a circular clamp-rib, of a clamp-ring having an annular guide-flange and a circular clamp-rib, a pneumatic casing between said hub and clamp-ring having its overlapping lips or meeting edges embraced between said clamp-ribs and a movable spoke-ring fitting between said guide-flanges and bearing against the casing, said spoke-ring being composed of two parts or members riveted together and provided with spoke-sockets embracing the spokes, substantially as specified.

7. In a pneumatic cushioned wheel for automobiles or other vehicles, the combination of a central hub having a guide-flange and a circular clamp-rib, of a clamp-ring having an annular guide-flange and a circular clamp-rib, a pneumatic casing between said hub and clamp-ring having its overlapping lips or meeting edges embraced between said clamp-ribs and a movable spoke-ring fitting between said guide-flanges and bearing against the casing, said clamp-ring and spoke-ring being provided with annular shoulders for receiving a supplemental or substitute solid supporting-ring, substantially as specified.

8. In a pneumatic cushioned wheel for automobiles or other vehicles, the combination of a central hub having a guide-flange and a circular clamp-rib, of a clamp-ring having an annular guide-flange and a circular clamp-rib, a pneumatic casing between said hub and clamp-ring having its overlapping lips or meeting edges embraced between said clamp-ribs and a movable spoke-ring fitting between said guide-flanges and bearing against the casing, and a substitute or supplemental solid supporting-ring interposed between the clamp-ring and the spoke-ring, substantially as specified.

9. In a wheel, the combination with a central hub having a circular clamp-shoulder, of a clamp-ring having a circular clamp-shoulder and a pneumatic casing having its overlapping lips or meeting edges embraced between said circular clamp-shoulders on the hub and clamp-ring, substantially as specified.

10. In a wheel, the combination with a central hub having a circular clamp-shoulder, of a clamp-ring having a circular clamp-shoulder and a pneumatic casing having its overlapping lips or meeting edges embraced between said circular clamp-shoulders on the hub and clamp-ring and a movable spoke-ring fitting between the hub and clamp-ring and bearing against the pneumatic casing, substantially as specified.

11. In a wheel, the combination with a central hub having a circular clamp-shoulder, of a clamp-ring having a circular clamp-shoulder and a pneumatic casing having its overlapping lips or meeting edges embraced between said circular clamp-shoulders on the hub and clamp-ring and a movable spoke-ring fitting between the hub and clamp-ring and bearing against the pneumatic casing and a clamp-nut threaded upon the hub and bearing against the clamp-ring, substantially as specified.

12. In a pneumatic cushioned wheel for automobiles or other vehicles, the combination of a central hub having a guide-flange and a circular clamp-rib, of a clamp-ring having an annular guide-flange and a circular clamp-rib, a pneumatic casing between said hub and clamp-ring having its overlapping lips or meeting edges embraced between said clamp-ribs and a movable spoke-ring fitting between said guide-flanges and bearing against the casing and a clamp-nut threaded upon the hub and bearing against the clamp-ring, substantially as specified.

13. The combination with a central hub, of a clamp-ring, a pneumatic casing, a spoke-ring and a sectional bearing-plate interposed between the casing and the spoke-ring, substantially as specified.

14. The combination with a central hub, of a clamp-ring, a pneumatic casing, a spoke-ring and a sectional bearing-plate interposed between the casing and the spoke-ring, said sectional bearing-plate and said spoke-ring having interengaging holding devices to prevent one from slipping in respect to the other, substantially as specified.

15. The combination with a central hub, of a clamp-ring, a pneumatic casing, a spoke-ring, and a sectional bearing-plate interposed between the casing and the spoke-ring, said sectional bearing-plate and said spoke-ring having interengaging holding devices to prevent one from slipping in respect to the other, and said casing being secured to said sectional bearing plate or ring, substantially as specified.

16. The combination with a central hub, of a clamp-ring, a pneumatic casing comprising two strips having abutting edges at the outer periphery of the casing, a sectional bearing-plate secured to said casing-strips, and a spoke-ring bearing against the casing, substantially as specified.

17. The combination with a central hub, of a clamp-ring, a pneumatic casing comprising two strips having abutting edges at the outer periphery of the casing, a sectional bearing-plate secured to said casing-strips, and a spoke-ring bearing against the casing, said spoke-ring and bearing-plate having interengaging holding devices, substantially as specified.

18. In a wheel for automobiles or other vehicles, the combination of a hub provided with an annular flange or plate having a circular clamp rib or shoulder, of a movable clamp ring or plate having a circular clamp rib or shoulder, a pneumatic casing between said hub flange or plate and said clamp ring or plate, and having its overlapping connecting edges clamped between said circular ribs or shoulders, a movable spoke-ring fitting between said hub flange or plate and said clamp ring or plate and bearing against the pneumatic casing, a rim, a cushion-tire and a channel on the rim for the tire, substantially as specified.

ELWOOD C. PHILLIPS.

Witnesses:
H. M. MUNDAY,
EDMUND ADCOCK.